US009196179B2

(12) United States Patent
Stuart et al.

(10) Patent No.: US 9,196,179 B2
(45) Date of Patent: Nov. 24, 2015

(54) TRANSACTION CARD WITH DISPLAY OF TRANSPORTATION SYSTEM UPDATES

(75) Inventors: Thomas William Stuart, Northants (GB); Asad Khalid Raja, Bristol (GB); Samuel Luke Mills, Somerset (GB); Richard Henry Bay, Essex (GB)

(73) Assignee: Xerox Corporation, Norwalk, CT (US)

( * ) Notice: Subject to any disclaimer, the term of this patent is extended or adjusted under 35 U.S.C. 154(b) by 870 days.

(21) Appl. No.: 13/417,921

(22) Filed: Mar. 12, 2012

(65) Prior Publication Data

US 2013/0237149 A1 Sep. 12, 2013

(51) Int. Cl.
*H04W 4/08* (2009.01)
*G06Q 20/34* (2012.01)
*G09F 9/37* (2006.01)

(52) U.S. Cl.
CPC ........ *G09F 9/372* (2013.01)

(58) Field of Classification Search
None
See application file for complete search history.

(56) References Cited

U.S. PATENT DOCUMENTS

| | | | | |
|---|---|---|---|---|
| 4,126,854 | A | 11/1978 | Sheridon | |
| 4,143,103 | A | 3/1979 | Sheridon | |
| 4,534,012 | A | 8/1985 | Yokozawa | |
| 6,636,160 | B2 | 10/2003 | Brei | |
| 7,385,508 | B1 * | 6/2008 | Ray et al. | 340/568.7 |
| 7,822,546 | B2 | 10/2010 | Lee | |
| 7,925,538 | B2 | 4/2011 | Capurso et al. | |
| 7,957,871 | B1 | 6/2011 | Echeruo | |
| 2003/0011868 | A1 * | 1/2003 | Zehner et al. | 359/296 |
| 2011/0166936 | A1 | 7/2011 | Dixon et al. | |
| 2012/0088449 | A1 * | 4/2012 | Norair | 455/41.1 |
| 2012/0173432 | A1 * | 7/2012 | Yeager | 705/65 |

* cited by examiner

*Primary Examiner* — Philip Sobutka
(74) *Attorney, Agent, or Firm* — Fox Rothschild LLP

(57) ABSTRACT

A method and system enables users of a system such as a mass transit system to receive status information about the system. The information may relate to one or more stops or vehicles along various routes of the system. The user is provided with a display device, and one or more readers are positioned throughout the system. The display device includes a display screen that displays system status information, a driving circuit, an antenna and an inductive coil. When the display device's inductive coil is in the presence of a proximate electromagnetic field and the antenna receives a data signal, the inductive coil delivers power to the driving circuit, and the driving circuit causes the display screen to display updated system status information.

21 Claims, 6 Drawing Sheets

TRANSACTION CARD WITH DISPLAY OF TRANSPORTATION SYSTEM UPDATES

BACKGROUND

When using a mass transit system, such as a train system, subway, bus service or air transportation network, it is often difficult for a passenger to obtain network status information that is relevant to the individual passenger. A passenger may be able to view a large board of transport information and see a large amount of status information about the entire network, but determining which information is relevant to the passenger can be confusing and time-consuming.

Some transportation system update services may provide status information to a user's smartphone. Such services may deliver the updates via a text message or through a smartphone application. However, these systems rely on the availability of both a smartphone battery and a cellular signal, and they do not work in places where mobile phone service is patchy and unreliable, such as subway stations.

This document describes methods and systems that may improve the delivery of transportation system updates to passengers in a mass transit system.

SUMMARY

In an embodiment, a system for receiving status information, such as information relating to one or more stops or vehicles along a mass transit system, includes a display device and a reader. The display device includes a display screen that displays system status information, a driving circuit, an antenna, and an inductive coil. When the display device's inductive coil is in the presence of a proximate electromagnetic field and the antenna receives a data signal, the inductive coil delivers power to the driving circuit. In addition, in response to the data signal, the driving circuit causes the display screen to display updated status information.

In some embodiments, the display screen may be a bichromal display device that includes a conductive substrate and a bichromal material positioned over the conductive substrate. In embodiments where the display is a bichromal display, the driving circuit may cause the display screen to display updated status information by inducing a voltage change in a portion of the conductive substrate. The voltage change then causes a corresponding change in an image displayed by the bichromal material to yield the updated status information.

In some embodiments, the system also includes a transaction card having a memory, a transponder and an antenna. The system also may include a card reader having an inductive coil that generates the electromagnetic field. The card reader may include a transceiver that generates the data signal. Alternatively, the card reader may be in electronic communication with an external transmitter that generates the data signal.

In some embodiments, the display device may include a battery. If so, the device's inductive coil also may deliver power to the battery when the inductive coil is in the presence of a proximate electromagnetic field. The system also may include a case having at least two receptacles. One receptacle is of a size and shape to receive and hold the display device, while the second receptacle is of a size and shape to receive and hold the transaction card.

In an alternate embodiment, a method of delivering status information (such as transportation system status information) to a user includes providing a user with a display device. The device includes a display screen, a driving circuit, an antenna, and a secondary inductive coil. The method may include receiving, via a card reader, an informational signal indicating that the user is located at a transportation stop. In response to receiving the informational signal. the method may include: (i) selecting data that is representative of system status information; (ii) generating a data signal containing the data; and (iii) activating a primary inductive coil to generate an electromagnetic field. When the field is received by the secondary inductive coil, the coil will use the field to power the driving circuit of the display device and cause the display screen to display the system status information. Optionally, the method may include providing the user with a transaction card that generates the informational signal.

In some embodiments of the method, the display device may include a bichromal material positioned over a conductive substrate. If so, causing the display screen to display the system status information may include causing a voltage change in a portion of the conductive substrate, such that the voltage change causes the bichromal material to display the system status information.

In some embodiments of the method, selecting the data that is representative of transportation system status information may include receiving system status information for a multiple of vehicles. If so, the method may include selecting a portion of the system status information for delivery to the user and/or delivering a common message to all user displays that the card reader detects within a certain period of time.

Also, in some embodiments when selecting a portion of the system status information for delivery to the user, the method may include accessing a database of user-specific information. Based on the user-specific information, the method may identify system status information that is relevant to the user. Optionally, if the method determines that the system status information that is relevant to the user has a size that exceeds a viewable size of the display device, the method may include prioritizing the system status information that is relevant to the user so that only a prioritized portion of the information appears as the selected information. Optionally, the method may include identifying a home route between the transportation stop and a home location of the user, identifying a transportation interruption corresponding to the home route, identifying an alternate route of travel between the transportation stop and the home location, and causing the display screen to display information corresponding to the alternate route of travel.

DETAILED DESCRIPTION

Figure 1:
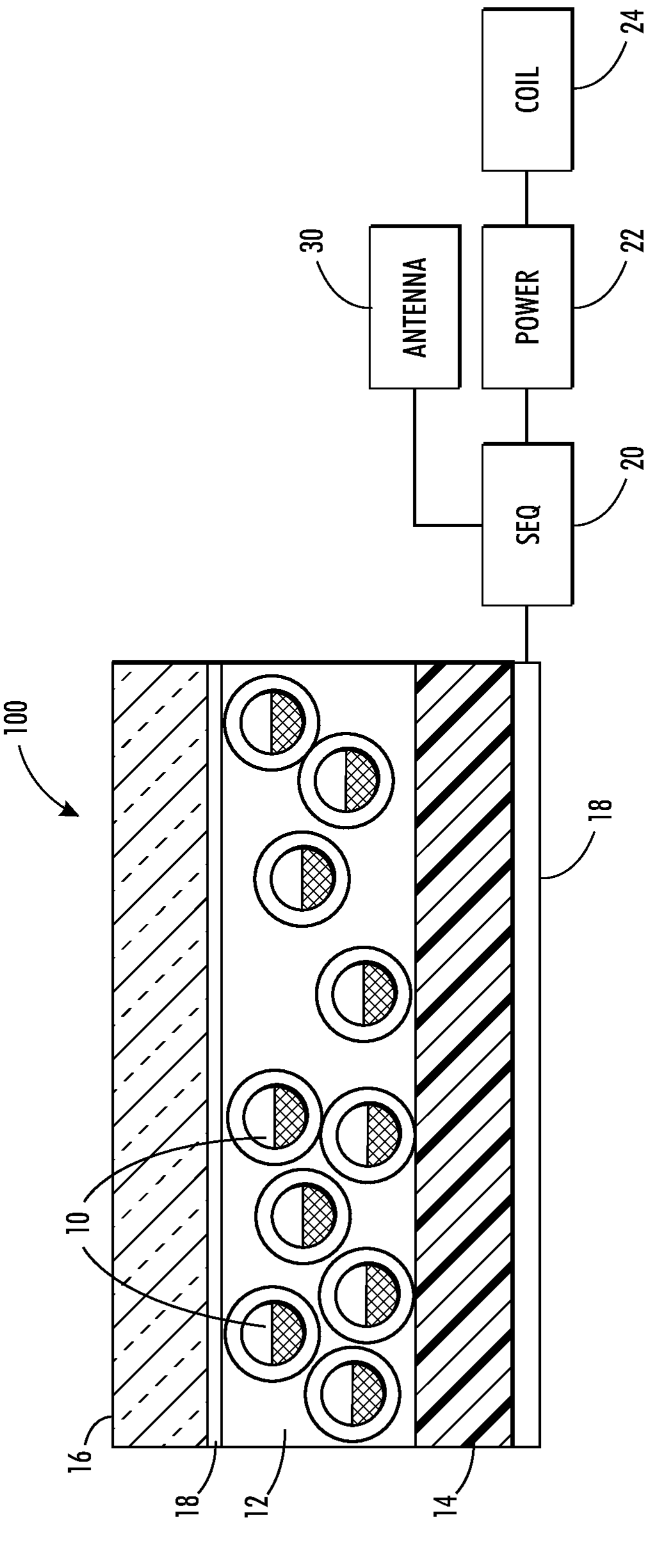
FIG. 1 shows several illustrative elements of a bichromal display device.

This disclosure is not limited to the particular systems, devices and methods described, as these may vary. The terminology used in the description is for the purpose of describing the particular versions or embodiments only, and is not intended to limit the scope.

As used in this document, the singular forms “a,” “an,” and “the” include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term “comprising” means “including, but not limited to.”

For the purposes of this document, the following definitions apply:

The word “bichromal” refers to a display or a particle that may exhibit two or more colors. A bichromal material may be modulated by an applied electric or magnetic field. For example, a bichromal bead in an oil-filled capsule may rotate inside the capsule in response to the applied field.

“Electronic communication” refers to any form of electronic sharing of data and/or instructions, including physically connected or wireless communication, as well as communication that is direct or indirect via one or more networks.

A “mass transit system” is a network of vehicles that carries multiple passengers or goods according to a predetermined schedule. As used in this document, a mass transit system may include a public transportation system such as a subway, train or bus system, as well as a private system such as a group of rides in a theme park.

A “vehicle” means a device or structure that transports people or things. Examples include a bus, above-ground or subway train, railcar, airplane, tram, elevator compartment or lift, and other conveyances.

A “transportation stop” is an intermediate or final destination at which a person or vehicle is scheduled to stop or pass through at a scheduled time. Examples of transportation stops may include a bus stop, train station, examination rooms in a medical office, conference attendee meeting rooms and other scheduled locations.

Bichromal displays made of electrophoretic particles or bi-stable inks are known. For example, as shown in cross-section and block diagram form in FIG. 1, a display device 100 may include a bichromal display material 10 such as a group of encapsulated bichromal beads, cylinders, crystals or other bichromal or multichromal particles dispersed in an elastomeric sheet swollen by a fluid 12 and positioned atop a conductive substrate 14, which is typically a printed circuit board or other conductive material. The particles, fluid and substrate are covered with a transparent layer (i.e., a screen) 16 such as glass or plastic and a transparent conductive material such as indium tin oxide (ITO) 18, and they are sealed to form a re-addres sable display material in which the particles rotate in response to an electric or magnetic field that is applied to the conductive substrate. Such materials have been described in, for example, U.S. Pat. Nos. 4,126,854 to Sheridon and U.S. Pat. No. 4,143,103 to Sheridon, the disclosures of each of which are incorporated herein by reference in their entirety.

The conductive substrate 14 includes or is in electronic communication with control circuitry that provides the voltage signals that generate electric fields in selected locations. Portions of the bichromal material will rotate or otherwise shift in response to the charge, resulting in a change to an image that is viewable through the transparent layer 16. In the embodiments described below, the control circuitry may have a driving circuit 18 such as an array of drive wires, a control sequencer 20, and an antenna 30 that receives data corresponding to text or images that will be displayed on the display in response to activation of the drivers 18 and a control sequencer. An inductive coil 24 receives an inductive charge that is used to power the display. In some embodiments, the display device may include a power supply 22 such as a battery that stores the charge that is received via the inductive coil.

Figure 2:
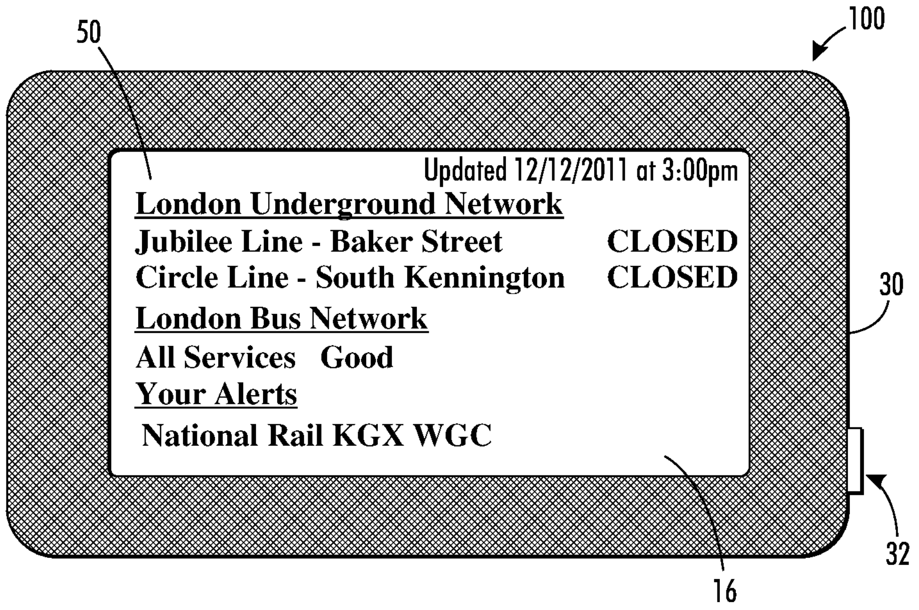
FIG. 2 illustrates a bichromal display device.

FIG. 2 illustrates an example of the display device of FIG. 1, showing the transparent layer 16 its underlying layers housed within a frame 30. In various embodiments, the device has dimensions that are similar to a typical transaction card—i.e., about 60 mm×53.98 mm (about 3.370 in×2.125 in)—and the frame is made of a flexible or semi-rigid material such as plastic so that it can be held in a person’s pocket, wallet, purse or similar location. Optionally, some the elements shown in FIG. 1, such as the power supply 22 and inductive coil 24, may be housed within the frame 30. Optionally, the frame may include an input device 32, such as a trackball, scroll wheel, one or more buttons, or other input device that a user may touch to cause an action to be taken on the device.

Figure 3:
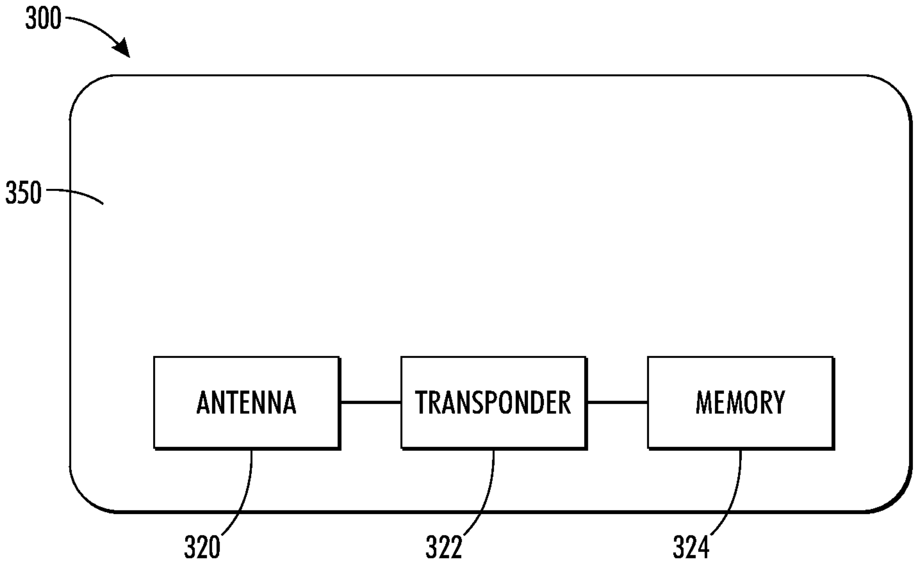
FIG. 3 is a block diagram illustrating exemplary elements of a contactless transaction card.

Transaction cards are also common. Transaction cards are typically thin plastic or paper cards in a rectangular shape that include a storage medium on which data can be stored. The cards are typically used for identification, access, or financial transactions. An example of a transaction card is a transit card that stores information that identifies a passenger and/or a passenger’s account information, such as available fare data. Another example is an identification card that may be given to a person who enters a secure building, or who has registered to attend various programs in a conference. FIG. 3 is a block diagram showing features of an exemplary transaction card. The card includes a substrate 350 that holds a memory 324 on which data is stored. If the card is a swipe card, then the memory may be a magnetic strip that stores the data. If the card is a contactless card, then the card also may include a transponder 322 and antenna 320 to receive data from or transmit data to an external card reader.

Figure 4:
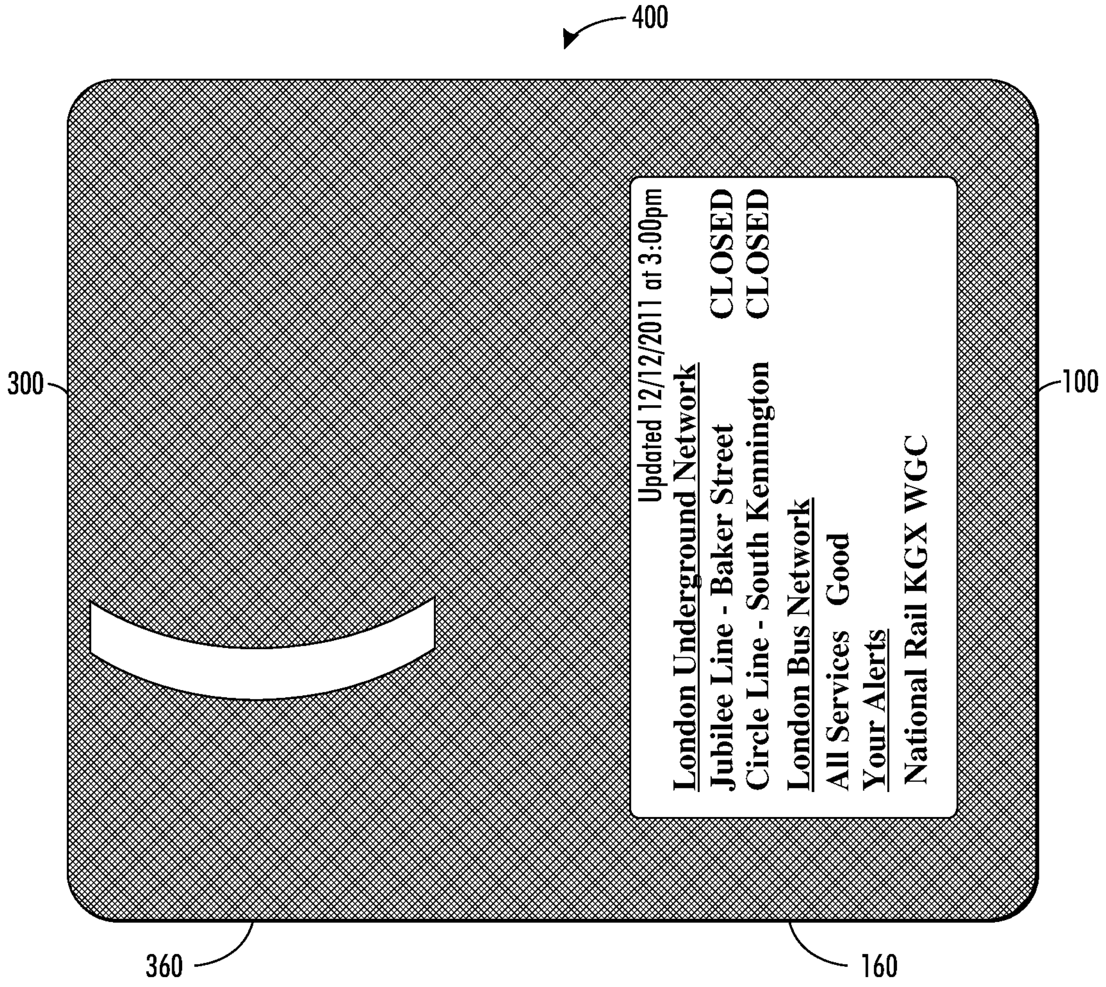
FIG. 4 shows a bichromal display and a transaction card packaged together in card holder.

In some embodiments, as shown in FIG. 4, a display 100 and transaction card 300 may be packaged together in card holder 400. The card holder, which may be similar to an existing credit card case, wallet, or similar holder, may have a first receptacle 160 for holding the display 100 and a second receptacle 360 for holding the transaction card 300. Each receptacle will have a size and shape that is appropriate to receive and hold its corresponding item.

In other embodiments, rather than using a separate display and transaction card, the transaction card itself may include the elements of a display such as that shown in FIG. 1. Exemplary transaction cards that include a display area are shown U.S. Pat. No. 7,284,708, the relevant disclosure of which is incorporated by reference. In addition, while the examples discussed above relate to a bichromal display, other displays may be used. Examples include color super twisted nematic (CSTN) displays, thin film transistor (TFT) displays, thin film diode (TFD) displays, organic light-emitting diode (OLED) displays, capacitive touch screens, and resistive touch screens.

Figure 5:
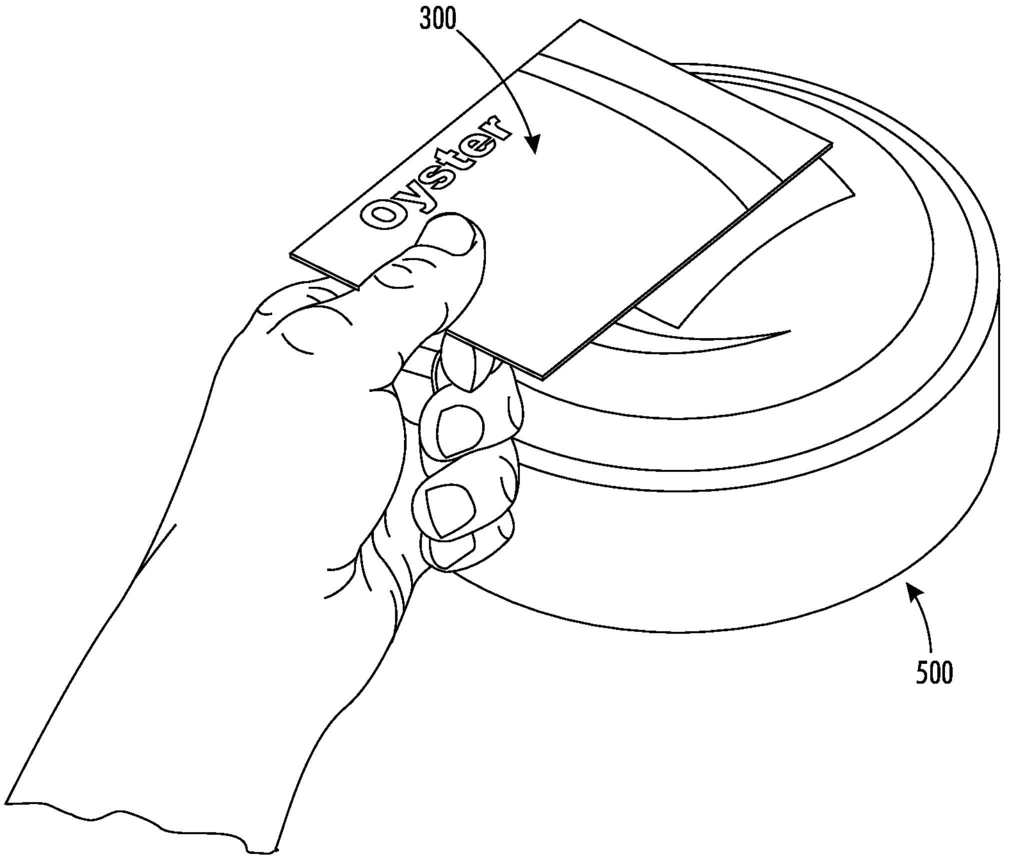
FIG. 5 shows a contactless transaction card being used in the vicinity of a card reader.

FIG. 5 shows a contactless transaction card 300 being used in the vicinity of a card reader 500. In a contactless system, the card reader 500 and card 300 will transfer data without the need for physical contact. Such systems may use any short range wireless communication technology such as NFC (near field communication), Bluetooth, Bluetooth low energy, radio frequency identification (RFID) or another technology.

Figure 6:
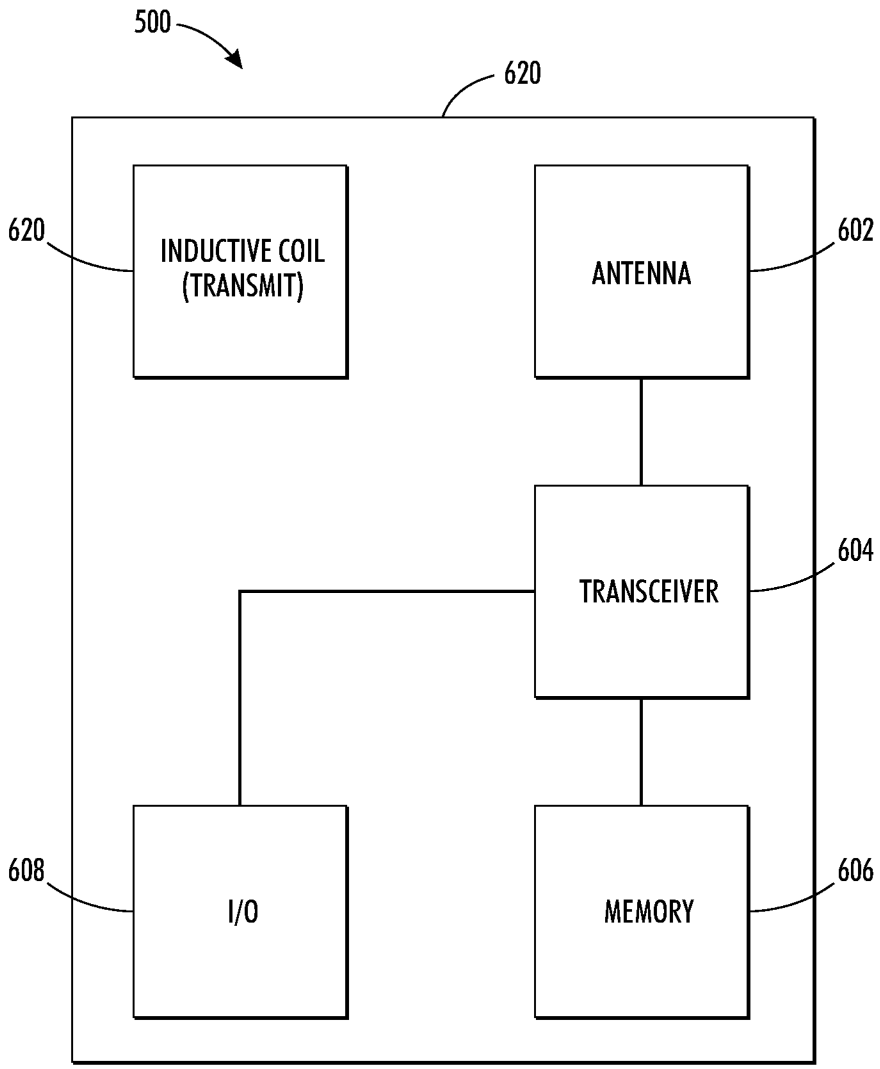
FIG. 6 is a block diagram showing elements of a card reader.

As shown in FIG. 6, the card reader 500 may include an antenna 602 and a transceiver 604. The transceiver 604 causes the transmission of data signals through antenna 602 that can be received by the transaction card 300 and/or display device 100 when placed within range of the card reader antenna's signal. The data signals may correspond to data that is stored in a memory 606, or which the card reader receives from an external source via one or more input ports or input/output ports 608. The card reader 500 also may include an inductive coil 620 that generates an electromagnetic field.

When the display is placed within range of the electromagnetic field, the display's inductive coil (see element 24 in FIG. 1) receives the field and uses the field to power the display device. As used in this document, the card reader coil that generates the field may be referred to as a "primary inductive coil", and the display's coil that receives the field may be referred to as a "secondary inductive coil." A device is "within range" of or "proximate" to the card reader and/or electromagnetic field when it is positioned within a distance of the card reader (or other electromagnetic field source) that will allow it to receive the field and use the field to power the device. In some embodiments where the display device includes a power storage unit such as a battery (see element 22 in FIG. 1), the power storage unit may store some of the charge received via the electromagnetic field to power device operations when the device is not located within range of the card reader. In such embodiments, the device also may be charged by any contactless charging device now or hereafter known to those of skill in the art, such as a charging pad having a primary inductive coil.

When the display device is made of a bichromal material, content that is displayed on the display will remain static and available for viewing when the device is not using any power. However, power may be required only to change the display. Optionally, in embodiments where the device includes a power source such as a battery, the device may include a function that prevents the device from being turned on for more than a threshold period of time if the device does not detect the presence of a mass transit system communication network, an electromagnetic field, or another required criterion. The threshold may be zero, or a short period of time such as 10 seconds, 30 seconds, or a minute, so that the device does not drain its battery when it is not in the presence of a power source or the mass transit system's communication network.

Figure 7:
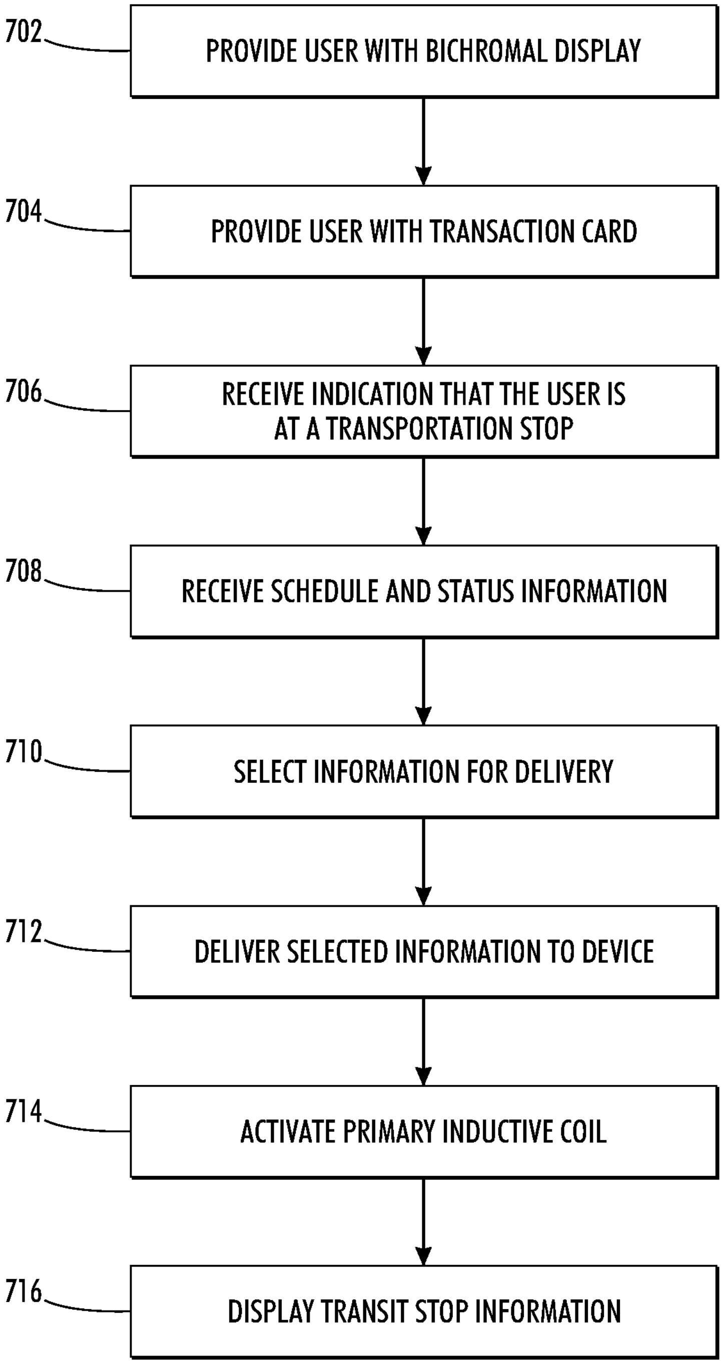
FIG. 7 is a flowchart illustrating steps in a process of providing a user with transportation system updates.

FIG. 7 is a flow diagram illustrating actions that may be taken when the system is in operation. In operation, a user may be provided with a bichromal display device 702 and a transaction card 704. The transportation card may be optional, or the display may be incorporated into the transaction card in some embodiments.

A card reader will receive an informational signal indicating that the user is located at a transportation stop 706. The informational signal may be sent to the card reader by the transaction card and/or the display device. The card reader may include an input/output port that is in communication with a system that contains schedule and status information about multiple transportation stops and, optionally, multiple vehicles. For example, in a mass transit system, the card reader may be in wireless or wired electronic communication with a scheduling system that provides status information for multiple trains, airplanes or other vehicles. The card reader will receive the schedule and status information 708, select a portion of the information for delivery to the user 710, and cause a data signal with the selected transportation stop schedule and status information to be transmitted to the display device 712. Alternatively, the card reader may store the transportation stop schedule and status information in a memory, and it may select the relevant information from the stored information. The memory may be updated on a periodic basis or in response to an incoming communication from an external source.

The card reader also includes an integral or separate primary inductive coil. When the card reader and the display are within a detection range of each other, in response to the informational signal, the card reader will activate the primary inductive coil 714 to generate an electromagnetic field. The display device includes a secondary inductive coil. When the display device's secondary inductive coil senses the field, it will use the field to power a driving circuit of the display device to cause a voltage change that in turn causes the device display the transportation stop status information 716. The electromagnetic field and the data signal may be required to be received simultaneously, or within a short threshold of time (e.g., approximately two minutes or less, approximately one minute or less, approximately thirty seconds or less, or another short period of time). FIG. 2 shows an example of display and status information for a subway and bus system indicating that certain stations on the subway are closed, while all services on the bus service are operating without interruption.

The selection of transportation stop schedule and status information may occur in one of various ways:

In some embodiments, a card reader may deliver a common message to all user displays that it detects within a certain period of time. For example, in FIG. 2, the common message 50 shows that certain train stations that are closed, while no disruptions occur on the bus network.

In other embodiments, a card reader may deliver a common message to all user displays based on the transportation stop or vehicle line with which the reader is associated. For example, the message may show the status of all vehicles that are scheduled to pass through the stop within an upcoming period of time (e.g., 30 minutes, 60 minutes, or another time). As another example, the message may show the status of a particular vehicle or a particular transit route to which the card reader controls access.

In other embodiments, the card reader may determine a user-specific message to display. For example, when the card reader receives the informational signal indicating that the user is located at a transportation stop, the system may access the available schedule and status information that is relevant to the user. Information may be determined as relevant to the user based on the user's known travel plans, based on user preferences that are stored in a database, or based on a user input at the card reader. The known travel plans and user preferences may be obtained from the user's account information for the transportation network. The account information may include records of travel routes purchased by the user, the user's previous routes, or user-selected preferences such as preferred routes and schedules. The account information may be stored on the transaction card, or it may be stored in an external database that is in electronic communication with the card reader via a wireless or wired communication network.

In some embodiments, the card reader may include instructions to deliver the user a "go-home" type feature that determines a route that is required to travel from the user's current location to a transit stop that is designated in the user's account information as the user's "home" stop. The system may check the schedule and status information for the vehicles along the get-me-home route and provide the user with a status information for one or more of those vehicles. Optionally, if any interruptions (such as delays or closures) exist for one or more of the vehicles or lines along the go-home route, the system may determine an alternate go-home route that avoids the delays and interruptions. If so, the system may transmit information about the alternate route to the display device so that the alternate route information is displayed to the user. Optionally, the system may first determine if the alternate route will result in a shorter travel time than the interrupted route before transmitting the alternate route information to the user.

In some embodiments, the card reader itself may include a transmitter that transmits the selected information to the display device. In other embodiments, or in addition, the card reader may transmit the information to an external transmitter or communication signal, which will generate the signal to be sent to the display device.

The size of the user's display may not be sufficient to display all of the selected information. If so, the selected information may be prioritized so that only the most relevant information, or information that has been marked as urgent, appears as the selected information. For example, transportation disruptions that are closest to the card reader's transportation stop, or disruptions along a route that is known to be a preferred route of the user, may be selected as the prioritized material for display, Alternatively, if the user's display has an input, all selected information may be transmitted to the display so that the user can use the input to scroll or advance through the information. If so, in some embodiments the most relevant or urgent information may appear first, with other information to follow when the user activates the input. Such embodiments would require that the display device include a power source, such a battery or capacitor that stores a charge, so that the user can operate the input when the device is not receiving power from the card reader or another source such as a charging pad.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A system for receiving transportation system status information, comprising:

a display device comprising:
 a display screen,
 a driving circuit,
 an antenna, and
 an inductive coil;

wherein when the inductive coil is in the presence of a proximate electromagnetic field generated by a card reader and the antenna receives a data signal from the card reader that comprises data that is representative of transportation system status information:
 the inductive coil delivers power to the driving circuit, and
 the driving circuit causes the display screen to display the data that is representative of transportation system status information.

2. The system of claim 1, wherein an inductive coil of the card reader generates the electromagnetic field.

3. The system of claim 2, wherein:

the display device is a bichromal display device that also comprises a conductive substrate and a bichromal material positioned over the conductive substrate, and the driving circuit is configured to, in response to the data signal, causes a voltage change in a portion of the conductive substrate, wherein the voltage change causes a corresponding change in an image displayed by the bichromal material to yield the updated data that is representative of transportation system status information.

4. The system of claim 2, wherein the card reader also comprises a transceiver that generates the data signal.

5. The system of claim 2, wherein the card reader is in electronic communication with an external transmitter that generates the data signal.

6. The system of claim 1, wherein the display device further comprises a battery, and the inductive coil also delivers power to the battery when the inductive coil is in the presence of a proximate electromagnetic field.

7. The system of claim 1, further comprising a case, the case comprising:

a first receptacle that is of a size and shape to receive and hold the display device; and a second receptacle that is of a size and shape to receive and hold the transaction card.

8. The system of claim 1, wherein the display device powers off within a certain period of time after failing to detect the presence of the electromagnetic field generated by the card reader.

9. A method of delivering transportation system status information to a user, comprising:

providing a user with a display device, the device comprising a display screen, a driving circuit, an antenna, and a secondary inductive coil;

receiving, via a card reader, an informational signal indicating that the user is located at a transportation stop;

in response to receiving the informational signal;
 selecting data that is representative of transportation system status information;
 generating a data signal containing the data that is representative of transportation system status information;
 activating a primary inductive coil to generate an electromagnetic field that, when received by the secondary inductive coil will power the driving circuit of the display device and cause the display screen to display the transportation system status information.

10. The method of claim 9, wherein:

the display device also comprises a conductive substrate and a bichromal material positioned over the conductive substrate;

the causing the display screen to display the transportation system status information comprises causing a voltage change in a portion of the conductive substrate, wherein the voltage change causes the bichromal material to display the transportation system status information.

11. The method of claim 9, further comprising providing the user with a transaction card that generates the informational signal.

12. The method of claim 9, wherein selecting the data that is representative of transportation system status information comprises:

receiving, from a scheduling system, system status information for a plurality of vehicles; and selecting a portion of the system status information for delivery to the user.

13. The method of claim 9, wherein selecting the data that is representative of transportation system status information comprises:

receiving, from a scheduling system, system status information for a plurality of vehicles; and delivering a common message to all user displays that the card reader detects within a certain period of time.

14. The method of claim 12, wherein selecting the portion of the system status information for delivery to the user comprises:

in response to receiving the informational signal, accessing a database of user-specific information; and based on the user-specific information, identifying system status information that is relevant to the user.

15. The method of claim 14, wherein selecting the portion of the system status information for delivery to the user also comprises:

determining that the system status information that is relevant to the user has a size that exceeds a viewable size of the display device; and prioritizing the system status information that is relevant to the user so that only a prioritized portion of the relevant system status information appears as the selected information.

16. The method of claim 14, wherein:

identifying system status information that is relevant to the user comprises:

identifying a home route between the transportation stop and a home location of the user, identifying a transportation interruption corresponding to the home route, identifying an alternate route of travel between the transportation stop and the home location; and the method also includes causing display screen to display information corresponding to the alternate route of travel.

17. A system for delivering information to a user, comprising:

a display device comprising:

a display screen that displays status information, a driving circuit, an antenna, and a secondary inductive coil; and a card reader having a primary inductive coil and a transmitter; wherein the primary inductive coil generates an electromagnetic field, and the transmitter transmits a data signal comprising data that is representative of transportation status information, when the reader detects that the display device is within a detection range; and in response to the generation of the electromagnetic field:

the secondary inductive coil receives the electromagnetic field and delivers power to the driving circuit, the antenna receives the data signal, and in response to the data signal, the driving circuit causes the display screen to display updated status information that comprises the data that is representative of transportation system status information.

18. The system of claim 17, also comprising a transaction card having a memory, a transponder, and an antenna.

19. The system of claim 18, wherein display device further comprises a battery, and the inductive coil also delivers power to the battery when the inductive coil is in the presence of the proximate electromagnetic field.

20. The system of claim 18, wherein:

the display screen comprises a bichromal material positioned over a conductive substrate, and the driving circuit is configured to, in response to the data signal, cause a voltage change in a portion of the conductive substrate, wherein the voltage change causes a corresponding change in an image displayed by the bichromal material to yield the updated status information.

21. The system of claim 17, wherein the display device powers off within a certain period of time after failing to detect the presence of the electromagnetic field generated by the card reader.

* * * * *